Feb. 20, 1962 F. E. TIFFANY 3,022,480

SANDWICH CIRCUIT STRIPS

Filed Feb. 7, 1957 2 Sheets-Sheet 1

INVENTOR

Frank Emery Tiffany

Feb. 20, 1962 F. E. TIFFANY 3,022,480

SANDWICH CIRCUIT STRIPS

Filed Feb. 7, 1957 2 Sheets-Sheet 2

INVENTOR

Frank Emery Tiffany

United States Patent Office 3,022,480

Patented Feb. 20, 1962

3,022,480

SANDWICH CIRCUIT STRIPS

Frank Emery Tiffany, Midpines, Calif.

Filed Feb. 7, 1957, Ser. No. 638,823
3 Claims. (Cl. 339—18)

This invention relates to new and useful improvements in constructing miniaturized electrical circuits, permitting, space and expenditure savings which were not attainable before in this art.

Briefly described, the invention consists of die cut thin and narrow resilient electrical conductor strips having equidistantly spaced and circularly arranged converging retentive contact fingers. Said contact fingers may be knocked out at will from the strip in such places where after assembly, no electrical continuity is required. The thus previously prepared conductor strips are then assembled between die cut dielectric strips.

Said dielectric strips having equidistantly spaced circular apertures which in turn coincide with the circularly arranged contact fingers on the conductor strip. Said alternately assembled strips are then sandwiched between two rigid dielectric strips. Said rigid dielectric strips have equidistantly spaced holes which coincide with the centers of the apertures on the dielectric strips and also with the centers of the contact fingers on the conductor strips. Through these coinciding holes, terminal pins are permanently inserted and held in position by the retentive force of the retained contact fingers. Both protruding ends of all terminal pins will serve to support all related electrical components of the desired electrical circuit.

The main object of the invention is to provide the ever increasing miniaturization demand of the electrical industry, with a new means to reduce the physical dimensions of any existing or future electrical circuits and to reduce to a fraction the expenditures and simplify the necessary equipments when producing signal experimental or mass produced electrical circuits.

Further object of the invention is, that it only requires one type of components which are adaptable for all types of circuit designs.

Further object of the invention is, that it is readily adaptable for automation where uniform length of strips may be automatically dispensed from rolls of continuous lengths of strips.

Further object of the invention is, that any experimental circuit may be modified repeatedly without the necessity of fabricating a new prototype of the circuit.

Further object of the invention is, that more than one such sandwiched circuit may be used in side by side relation or one on the top of the other as the space in premium may dictate.

Further object of the invention is, to reduce set up time, and to boost production in applications where a variety of subminiaturized circuits are developed for testing or mass production purposes, by elimination of the complicated photochemical, etching and other known processes which are employed in this art.

The explicit details selected for accomplishing this important result will become more readily apparent from the following description and drawings.

Figure 11:
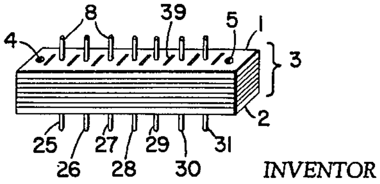
Figure 9:
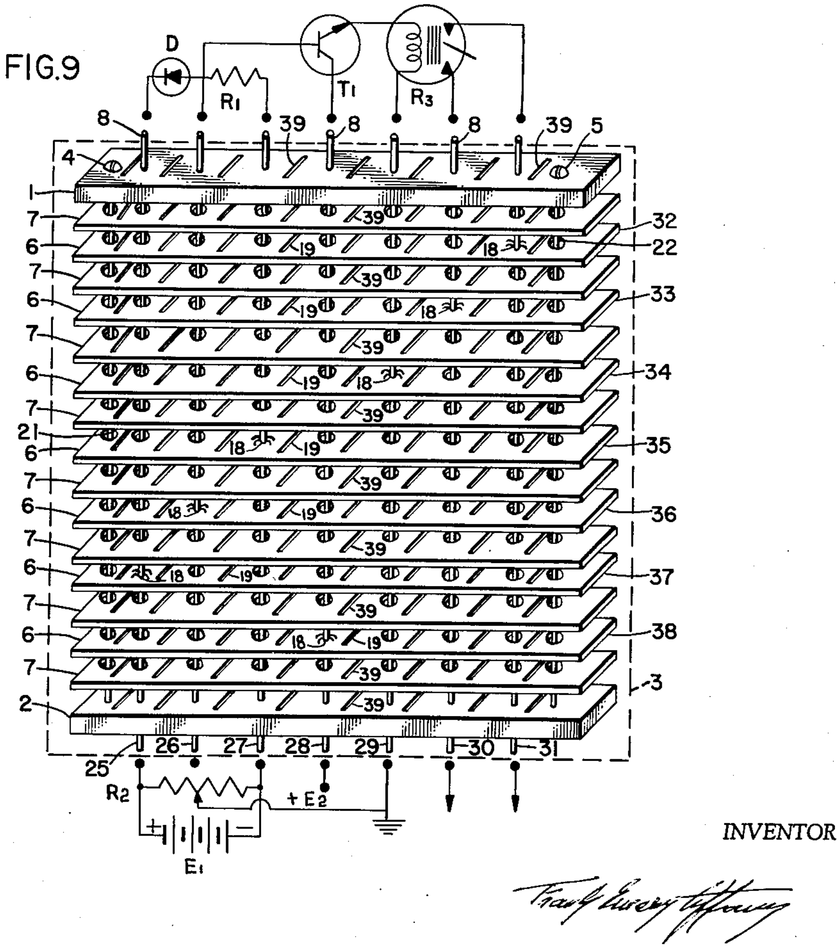

FIGURE 9 is a schematic illustration of an expanded cross section of the FIGURE 11, in which is shown the interrupted continuity where the contact fingers have been knocked out and shows the electrical continuity where the contact fingers have been retained, also is shown through this illustration the established continuity which provide a circuit for an exemplary photo diode device and is shown how the components of said photo diode are related to both protruding ends of the terminals of said sandwiched circuit.

Figure 10:
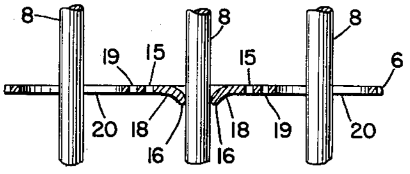
Figures 6, 7:
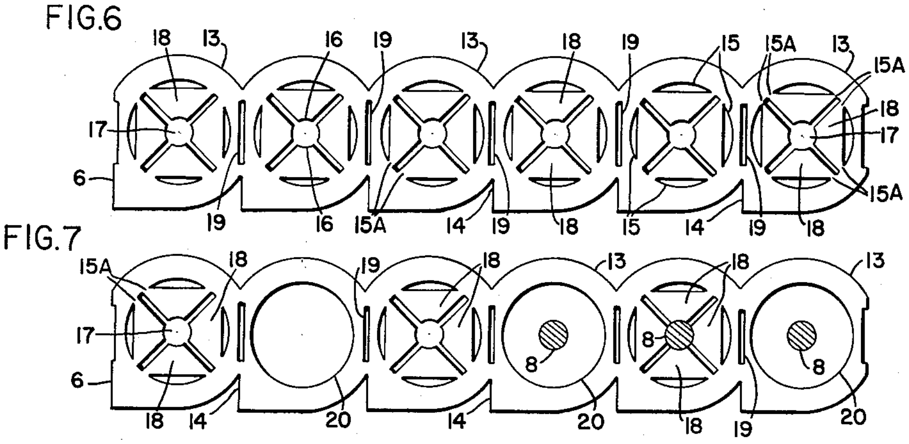
FIGURE 6 is an elevational view of a section of the resilient conductor strip and shows its features in more details and shows the circularly configurated top edge and shows the saw tooth configuration of the lower edge to facilitate oriented assembly.
FIGURE 7 is an enlarged elevational view of a section of the resilient conductor strip and shows in more details of the location of one terminal pin held in permanent continuity position by the converging retentive contact fingers and shows where said converging contact fingers had been knocked out.

FIGURE 10 is a central vertical sectional view of FIGURE 7 in which is shown a terminal pin held in permanent contact continuity position by the converging retentive contact fingers.

FIGURE 11 is a perspectivic view of the possible enlarged physical size of the sandwiched circuit which is shown in FIGURE 9 in an expanded schematic illustrative cross section.

Similar reference numerals in the drawings refer to similar parts throughout the several views.

In the following specification, and the accompanying drawings, I shall describe and show preferred forms of my invention, and specifically mention certain of its more important objects. I do not limit myself to the forms disclosed however, since various changes and adaptations may be made without departing from the essence of my invention as hereinafter claimed, and objects and advantages, other than those specifically mentioned, are included within its scope.

In my experiments searching for a new and more satisfactory means to produce subminiaturized circuits which could be constructed without resorting to photographic etching or other methods which are presently in use in producing printed circuits, I have discovered that any electrical circuit, regardless of the intricacy, could be produced in such a small physical dimension which was not practical or attainable before in this art, and without such consequences as warping of the supporting medium, uneven conductivity, and difficulty in establishing reliable electrical contact with electrical components.

To achieve these valuable results I invented a new type of, so to speak, universal conductor strip, which when produced in accordance with my invention and assembled into an electrical circuit, will sustain extreme abuses, maximum temperature changes, will maintain uniform current carrying capacity and adaptability to any environmental conditions without penalty due to its subminiaturized compact size.

In accordance with my invention any proposed electrical circuit may be simplified in a drawing into horizontal and vertical lines, in which all horizontal lines should represent the electrical wiring separated into common continuity lines, and all vertical lines which intercept any of the horizontal lines, the point of interception should represent a respective terminal point, to which electrical components intended to be attached.

Basically my invention composes: First, the referred to conductor strips; second, separator dielectric strips; third, rigid strips; and fourth, terminal pins. Means are incorporated to sandwich said strips together by means of end fasteners.

The referred to conductor strips are fabricated in any continuous length and are die cut from suitable spring material, preferably from thin narrow beryllium copper, having Rockwell hardness to suit the purpose of the application.

The referred to conductor strips have at one edge equidistantly spaced wavy configurations, and on the opposing edge have equidistantly spaced saw tooth configurations, which permits oriented assembly of the strips into a sandwiched circuit without assembly errors. Between each wave and saw tooth configuration are provided, within circular setting, converging retentive contact fingers which are equidistantly spaced on the whole length of the strip. Between said circularly set contact fingers are provided divisional slots, through which at any such slot the conductor strip may be split or cut away from the rest of the strip.

The referred to circularly set converging fingers are made in such a way that at will they may be knocked out from its circular setting by means of simple punching device.

It will be evident that in following a circuit design simplified into horizontal and vertical lines, that each of the horizontal lines in the design will represent one of these conductor strips, and in accordance with the design where any vertical lines intercept said horizontal line, a contact point will be established, and therefore on the conductor strip, at all such intercepting points the contact fingers will be retained, and all the remaining contact fingers must be knocked out from its circular setting.

Figure 1:
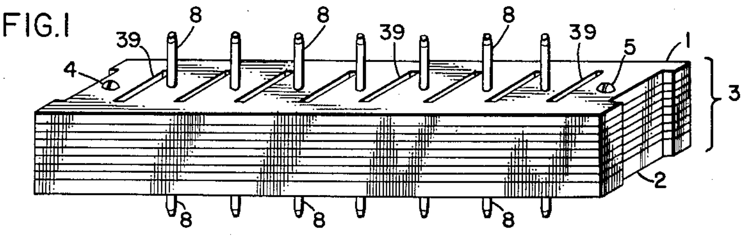
FIGURE 1 is a perspective view of an enlarged sandwiched circuit assembled from the strips.

The simplest kind of sandwiched circuit for this purpose, which may be considered as the generic form of the principal element of my invention, may take the shape of a small block, similar to a rectangular bar, such as is shown in FIGURE 1, in which 1 is the upper and 2 is the lower rigid strips, the sandwiched circuit elements 3, the end fasteners 4 and 5, the terminal pins 8, and the divisional slots are 39.

Figure 2:
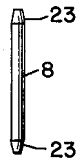
FIGURE 2 is a front elevational view of an enlarged terminal pin.

In FIGURE 2 the terminal pin is 8, and the bevelled end 23.

Figure 3:
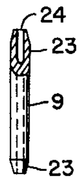
FIGURE 3 is a front elevational view of another variation of an enlarged terminal pin partially in cross section to show its tubular construction.

In FIGURE 3 is shown a second specific form of a terminal pin 9, partially in cross section to illustrate its tubular 24 construction and also shown the beveled ends 23 of the terminal pin.

Figure 4:
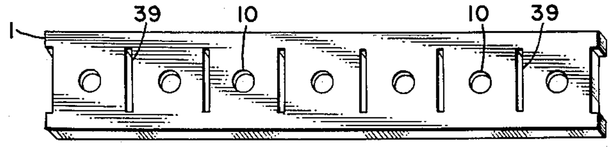
FIGURE 4 is a top elevational view of a rigid dielectric strip and shows the equidistantly spaced terminal pin inserting holes and shows the divisional slots.

In FIGURE 4 is shown the generic form of a rigid strip 1, and shown the equidistantly spaced terminal pin inserting holes 10, and the equidistantly spaced divisional slots 39, through which at any such slot the rigid strip may be split or cut away from the rest of the strip.

Figure 5:
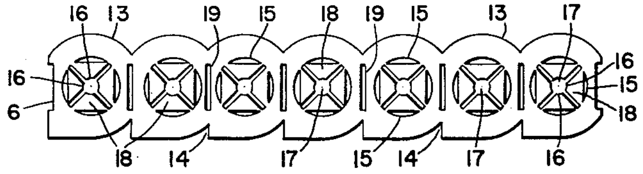
FIGURE 5 is a top elevational view of a resilient conductor strip and shows the equidistantly spaced circularly arranged contact fingers and shows the slots arranged contact fingers and shows the slots arranged within said circularity to facilitate simple means to knocking out of said contact fingers and shows the divisional slots.

In FIGURE 5 is shown the generic form of a resilient conductor strip 6, and is shown the wavy upper edge configurations 13, and the lower edge saw tooth configurations 14, and shown the divisional slots 19, through which at any such slot the conductor strip 6 may be split or cut away from the rest of the strip.

In FIGURE 6 is shown an enlarged portion of FIGURE 5 in which the resilient conductor strip is 6, the upper wavy edges are 13, the lower saw tooth edges are 14, the circularly arranged converging contact fingers are 18, the center holes 17 are for inserting terminal pins 8, the circularly formed contact edges are 16 through which the retentive force of the contact fingers 18 establishes a permanent pressure contact on the inserted terminal pin 8, also is shown the segment slots 15 within its circular setting 20 by which the removal of the contact fingers 18 is facilitated in places where no electrical contact is desired between conductor strip and the inserted terminal pin.

In FIGURE 7 is shown an enlarged elevational view of a section of the resilient conductor strip 6, and is shown one terminal pin 8 inserted between the converging retentive contact fingers 18, and is shown where the other clusters of contact fingers 18 have been removed from their circular setting 20, also are shown the upper wavy configurations 13 on the upper edge and the saw tooth configurations 14 on the lower edge, and also are shown equidistantly spaced divisional slots 19.

Figure 8:
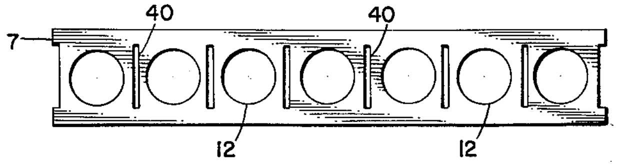
FIGURE 8 is a top elevational view of a section of a dielectric strip and shows the apertures and the divisional slots.

In FIGURE 8 is shown the top elevational view of a section of a dielectric strip 7 the function of which is to separate each conductor strip from each other, also is shown the equidistantly spaced circular apertures 12, the diameter of said apertures 12 being the same as the diameter of the circular setting 20 on the conductive strip 6, and are shown the divisional slots 40 by which at any such slot the dielectric strip 7 may be split or cut away from the rest of the strip.

In FIGURE 9 is shown in enlarged schematic illustration the vertically expanded view of FIGURE 11, in which between the rigid strips 1 and 2 are shown seven conductor strips 6, between separating dielectric strips 7, where said protruding terminal pins 8 make electrical connections as follows, conductor strip 32 with the terminal pin 31, conductor strip 33 with terminal pin 30, conductor strip 34 with terminal pin 29, conductor strip 35 with terminal pin 27, conductor strip 36 with terminal pin 26, conductor strip 37 with terminal pin 25, and conductor strip 38 with terminal pin 28. Also are shown the provided dielectric fasteners 21 and 22, which are secured by heading 4 and 5.

To permit a more clear illustration of this new type of electrical circuit, FIGURE 9 shows all circuit elements represented by the conducting strips 6 stacked up in vertical plane one on the other to form a sandwiched block circuit 3, and all terminal pins 8 are protruding through all conducting strips 6, but only are in continuity contact with those conducting strips 6 where the respective clusters of the contact fingers 18 have been retained.

Furthermore, only for the purpose of illustration, the circuit shown in FIGURE 9 was adapted to be a photo diode device with the following electronic components may be considered as demonstrative as follows, D is a 1N77A, photo diode, $E^1$ is a 22–45 volts supply, $E^2$ is a 6–12 volts supply, $T^1$ and $T^2$ are 2N35 transistors, $R^1$—100K, $R^2$—50 K pot., $R^3$—400G relay.

In FIGURE 10 is shown a central vertical sectional view of FIGURE 7 in which is illustrated the manner in which the inserted terminal pin 8 is held in pressure contact between the downwardly flexed edges 16 of the cluster of contact fingers 18, also are shown in cross section the locations of the divisional slots 19. It also illustrates the established electrical continuity at the points of edges 16 where the cluster of contact fingers 18 is in pressure contact with terminal pin 8 and the electrical continuity is being prevented between terminal pins 8 and conductor strips 6 at locations where said clusters of contact fingers 18 were previously removed from their circular settings 20. Each of the circular apertures equidistantly distributed on the conductor strips provides the circular setting for clusters of converging retentive contact fingers and each of said contact fingers is trapezoidally configurated and each of the contact fingers has circumferentially arranged small slots 15, the length of said slots being limited by narrow marginal retaining strips 15A disposed at both ends of said slots and defining the line where said contact fingers are integral with the conductor strip and defining the marginal line where said contact fingers could be separated from said circular apertures for the purpose of preventing electrical continuity between terminal pins 8 and conductor strips 6.

In FIGURE 11 is shown in a perspective view of the FIGURE 9 expanded circuit, in which the stacked up circuit elements 3 are sandwiched between rigid strips 1 and 2, and fastened by the end together by fasteners 4 and 5, also are shown all terminal pins 25, 26, 27, 28, 29, 30 and 31, which are protruding through the sandwiched device 3.

Obviously my invention may be utilized in a great variety of forms, adapted to any electrical circuit. All such forms require the general arrangements described, are contemplated by me, and are within the scope of my invention. Naturally the proportions and size of the parts may be changed at will, and, if desired, all component parts may be made smaller or larger in accordance of the purpose and the limitation of the space.

It will be apparent that my invention affords means for producing subminiature electrical circuits of any intricacy in such small space, simple construction and adaptability, in a manner that is not possible with devices known to the prior art.

Having thus fully described my invention, I claim:

1. A sandwich circuit device adapted to reproduce electrical circuits in infinite variations which are normally schematically represented in a grid pattern where all conducting lines are parallel in relation to each other and all junctions and terminals thereon are represented at right angle lines in relation to said conducting lines, said sandwich circuit device comprising identical number of conductor strips with as many conducting lines are in said grid pattern, said conductor strips being alternated by dielectric strips, said alternated strips being sandwiched together by two rigid dielectric face plates, said conductor strips having equidistantly spaced disposable groups of trapezoid configurated retentive contact fingers arranged within circular settings, each groups of contact fingers terminating in a small aperture within the center of said circular setting, each such trapezoid configurated contact fingers integral with said conductor strip by two marginal links defining the points of break away from said circular setting, wavy and opposing saw tooth configurations comprising respectively the edges of said conductor strips, said insulating strips comprising said sandwich circuit device having equidistantly distributed small apertures coinciding with said apertures on the conductor strips at the terminations of said retentive contact fingers, all of said strips comprising said sandwich circuit device having coincidingly and equidistantly distributed divisional slots, the length of said slots being limited by marginal links defining the points of uniform break away lengths of said strips, the length of said strips comprising said sandwich circuit device limited by the total number of junctions and terminals to be reproduced from said grid pattern, each conducting line in said grid pattern being duplicated by one separate conductor strip in said circuit device and each of the retained groups of retentive contact fingers on each conductor strips being adapted to duplicate the relative location and number of junctions and terminals of each conductive line in said grid pattern, a plurality of terminal pins permanently disposed through and beyond the structure of said circuit device throught each of said coinciding circular apertures adapted to intimately pressure engage respective groups of retentive contact fingers purposely retained for the making of continuity within said circuit device to provide a duplicate circuit of said grid pattern, the exposed sections of said terminal pins are adapted to support auxiliary electrical or electronic components and connections for electrical power.

2. A sandwich circuit device comprising a plurality of conductor strips separated by dielectric strips and sandwiched between two rigid dielectric face plate strips, a plurality of terminal pins permanently and equidistantly disposed through and beyond and at the center line of said device, groups of disposable clusters of trapezoid configurated converging retentive contact fingers being arranged within equidistantly spaced circular settings at the center line of said conductor strips, saw tooth and opposing wavy configurated edges disposed on said conductor strips to define correct assembly, each group of contact fingers terminating in a small aperture within the center of said circular setting, said rigid dielectric strips having at their center line equidistantly distributed small apertures defining the proper alignment for said terminal pins, said first-mentioned dielectric strips having apertures aligned with said small apertures, divisional slots between said apertures coincidingly disposed on all said strips defining the weakest points for break away at identical lengths of all said strips, said circular settings willfully vacated by said converging contact fingers adapted to provide the necessary clearance around said terminal pins to prevent unwanted electrical continuity between said terminal pins and conductor strips, each of the willfully retained groups of converging retentive contact fingers on each conductor strips being adapted to provide an intimate electrical contact between said terminal pins and said conductor strips, said sandwich circuit device adapted to duplicate unlimited variety of electrical circuit configurations by means of said single type of conductor strips each of which is adapted by disposal or retainment of preselected groups of converging con'act fingers to define the path of any combination of electrical circuitry within said sandwich circuit device.

3. A self contained electrical circuit device comprising alternately arranged conducting and dielectric separator strips sandwiched between two rigid dielectric strips, a plurality of terminal pins equidistantly and permanently disposed through and beyond the body of said circuit device and adapted to engage in intimate contact relation with selectively retained clusters of contact fingers disposed on said conducting strips to provide e'ectrical continuity at previously determined coinciding points between any of said terminal pins and between any of said conducting strips, each of said conducting strips having equidistantly repeating wavy configurations on one edge and equidistantly repeating saw tooth configurations on the opposite edge, clusters of trapezoid configurated converging retentive contact fingers being arranged within equidistantly spaced circular settings, between each of said wavy and coinciding saw tooth configurations formed by circumferentially arranged small slots between narrow retaining marginal links disposed at the opposite ends of said slots and defining the line where said contact fingers are integral with the conductor strips and defining the line where said contact fingers are designated to be separated from said circular aperture in conformity with preselected electrical circuit design to prevent electrical continuity between terminal pins and conductor strips by all such willfully voided circular apertures where said contact fingers have been removed, and between said clusters of contact fingers disposed within their circular settings, equidistantly spaced divisional slots being arranged, said divisional slots being disposed at coinciding relation with similar divisional slots provided on said separator dielectric and rigid dielectric strips, and all said divisional slots being adapted to provide coinciding length for measurements and being adapted to be split or cut away from the rest of the strips at will by any of said divisional slots to provide uniform length of strips for said circuit device.

References Cited in the file of this patent

UNITED STATES PATENTS 840,537 Weir ---------- Jan. 8, 1907
1,938,752 Merk ---------- Dec. 12, 1933

(Other references on following page)

UNITED STATES PATENTS

| | | |
|---|---|---|
| 1,952,554 | Lavarack | Mar. 27, 1934 |
| 2,281,958 | Snavely | May 5, 1942 |
| 2,337,397 | McWilliams | Dec. 21, 1943 |
| 2,442,984 | Paris | June 8, 1948 |
| 2,473,705 | George | June 21, 1949 |
| 2,481,951 | Sabee et al. | Sept. 13, 1949 |
| 2,613,287 | Geiger | Oct. 7, 1952 |
| 2,765,450 | Richardson | Oct. 2, 1956 |

FOREIGN PATENTS

| | | |
|---|---|---|
| 814,757 | Germany | Sept. 24, 1951 |